(12) United States Patent
Cheng

(10) Patent No.: US 8,048,355 B2
(45) Date of Patent: Nov. 1, 2011

(54) METHOD OF MAKING A BICYCLE RIM

(75) Inventor: Chieh-Sheng Cheng, Taichung (TW)

(73) Assignee: Carbotec Industrial Co., Ltd., Taichung ( * ) Notice: Subject to any disclaimer, the term of this patent is extended or adjusted under 35 U.S.C. 154(b) by 103 days.

(21) Appl. No.: 12/472,352

(22) Filed: May 26, 2009

(65) Prior Publication Data

US 2010/0301664 A1    Dec. 2, 2010

(51) Int. Cl.
  *B29C 65/02*    (2006.01)
  *B29C 65/70*    (2006.01)
(52) U.S. Cl. ......... 264/248; 264/250; 264/257; 264/275
(58) Field of Classification Search .................. None
  See application file for complete search history.

(56) References Cited

U.S. PATENT DOCUMENTS

| | | | | |
|---|---|---|---|---|
| 4,030,754 | A * | 6/1977 | Merlette | 301/95.103 |
| 4,294,639 | A * | 10/1981 | Woelfel et al. | 156/185 |
| 5,061,013 | A * | 10/1991 | Hed et al. | 301/64.704 |
| 5,540,485 | A * | 7/1996 | Enders | 301/104 |
| 5,549,360 | A * | 8/1996 | Lipeles | 301/64.703 |
| 6,347,839 | B1 * | 2/2002 | Lew et al. | 301/95.102 |
| 6,761,847 | B2 * | 7/2004 | Meggiolan | 264/257 |
| 7,883,157 | B2 * | 2/2011 | Theilig et al. | 301/64.704 |
| 2003/0107260 | A1 * | 6/2003 | Ording et al. | 301/95.102 |
| 2008/0174168 | A1 * | 7/2008 | Yang | 301/95.102 |

* cited by examiner

*Primary Examiner* — Edmund H. Lee

(57) ABSTRACT

A bicycle rim includes a substantially H-shaped outer part including an annular body and two sidewalls. A tire space is defined between the annular body and the two sidewalls. A substantially U-shaped inner part is connected to the outer part. The inner part and the outer part are made by composite material. The outer part is made before the inner part which is combined with the outer part in another mold.

8 Claims, 6 Drawing Sheets

METHOD OF MAKING A BICYCLE RIM

FIELD OF THE INVENTION

The present invention relates to a bicycle rim, and more particularly, to a bicycle rim made of composite material and a method for making the bicycle rim.

BACKGROUND OF THE INVENTION

A conventional bicycle rim is made of metal such as Aluminum alloy which is strong and easily formed. Nevertheless, the conventional bicycle rim is heavy and cannot satisfy the needs from the market, especially for racing bicycles and road bicycles. In order to reduce the weight of the bicycle rims, some manufacturers use fibers material o be the inner portion of the rim which includes an outer portion made of metal. This improvement can only achieve limited goals for having a light bicycle rim.

A further improvement for the bicycle rim is to make the whole bicycle rim by fibers material. The method for making the light bicycle rim uses a bladder completely or partially enclosed by the fibers material and both of which are then arranged into a mold set. The bladder is inflated and contacts against the fibers material to form the chamber in the bicycle rim and the fibers material is heated under a pre-set pressure, so that when the fibers material becomes stiff in the mold, the bicycle rim is formed with the light material and a space is defined within the rim. However, the thickness of the bladder cannot be controlled perfectly so that the thickness of the rim varies. Therefore, the manufacturers have to proceed extra trimming or machining steps to the rim so as to meet the expected design purposes. If the shape of the annular curved groove becomes a U-shaped groove with straight sidewalls then the structural strength of the bicycle rim will be weakened.

The present invention intends to provide a bicycle rim made of composite material and the method for making the rim includes two times of heat-molding to respectively make the outer part and the inner part of the rim so as to obtain the strong and light bicycle rims.

SUMMARY OF THE INVENTION

The present invention relates to a method for making a bicycle rim and the method comprises the following steps:

outer part arrangement (step 1): arranging composite material to be the outer part in a first mold;

outer part molding (step 2): heating the arranged outer part under pressure and the composite material being solidified to form the outer part which includes an annular body with two sidewalls, a tire space defined between the annular body and the two sidewalls, each sidewall having an outside;

inner part arrangement (step 3): arranging the outer part in a second mold and arranging composite material to be an inner part which encompasses at least one part of the outsides of the outer part, and inner part molding (step 4): heating the composite material of the inner part in the second mold to combine the outer and inner parts to be the bicycle rim.

The primary object of the present invention is to provide a light and precise bicycle rim wherein the outer part is individually made by way of heat and press, and the outer part is easily controlled to be precise. The outer part is then combined with the inner part in a mold.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
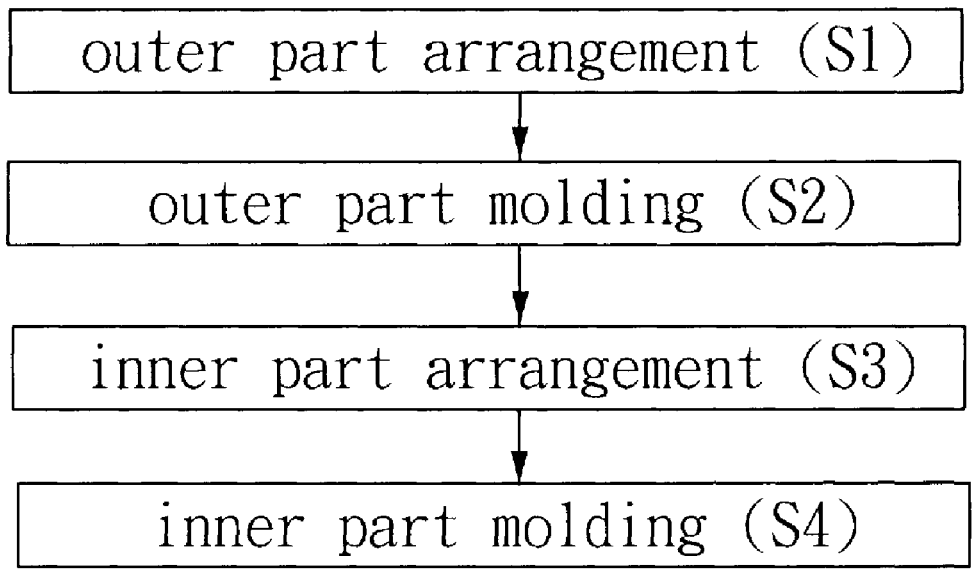
FIG. 1 shows the steps of the method for making a bicycle rim of the present invention.
Figure 2:
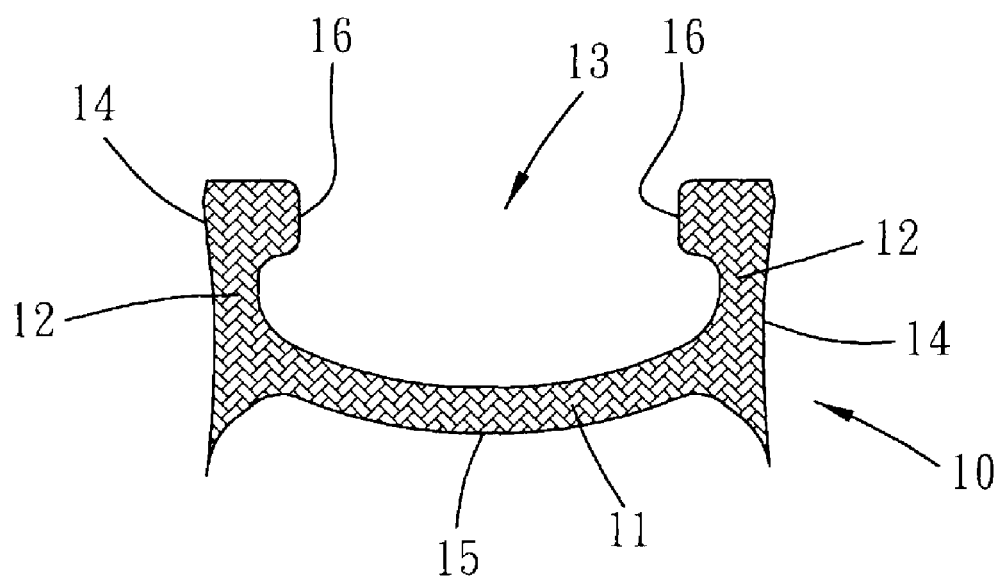
FIG. 2 is a cross sectional view of the outer part of the bicycle rim of the present invention.
Figure 1A:
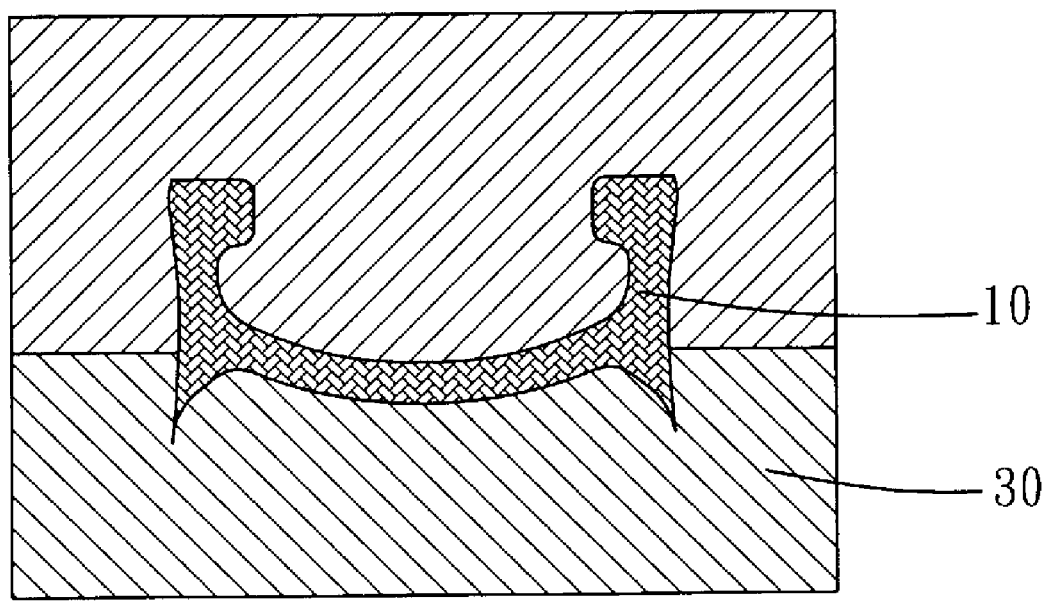
FIG. 1A is a cross sectional view to show that the outer part is formed in the first mold set.
Figure 1B:
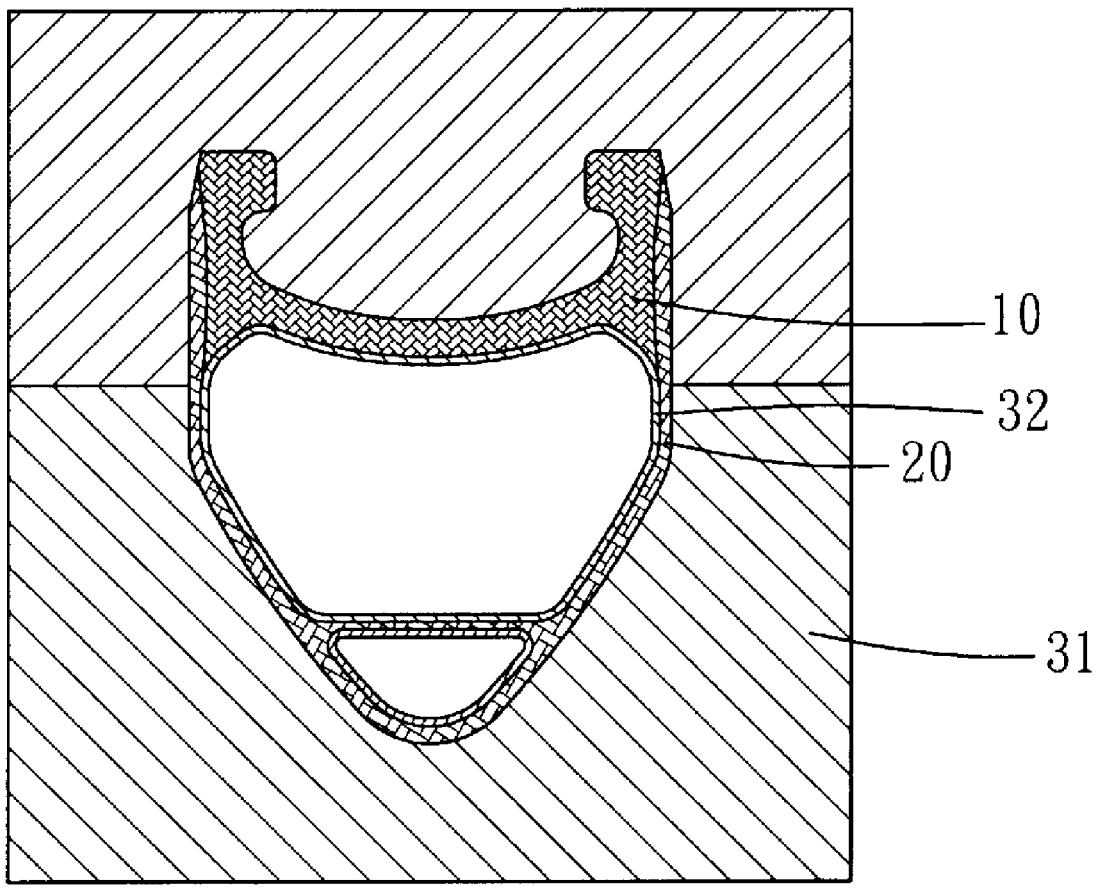
FIG. 1B is a cross sectional view to show that the outer part and the inner part are combined in the second mold set.
Figure 3:
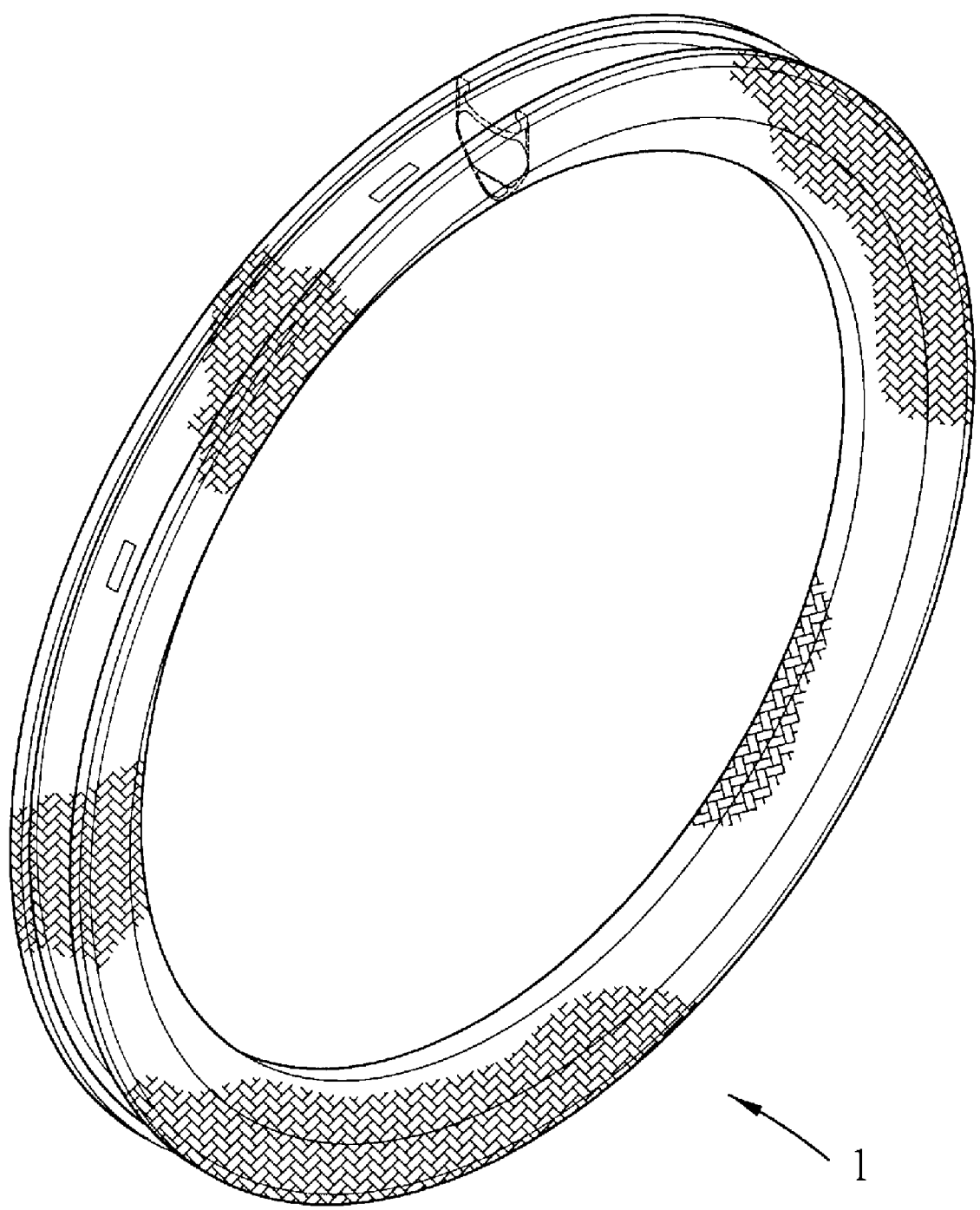
FIG. 3 is a perspective view to show the bicycle rim of the present invention.
Figure 4:
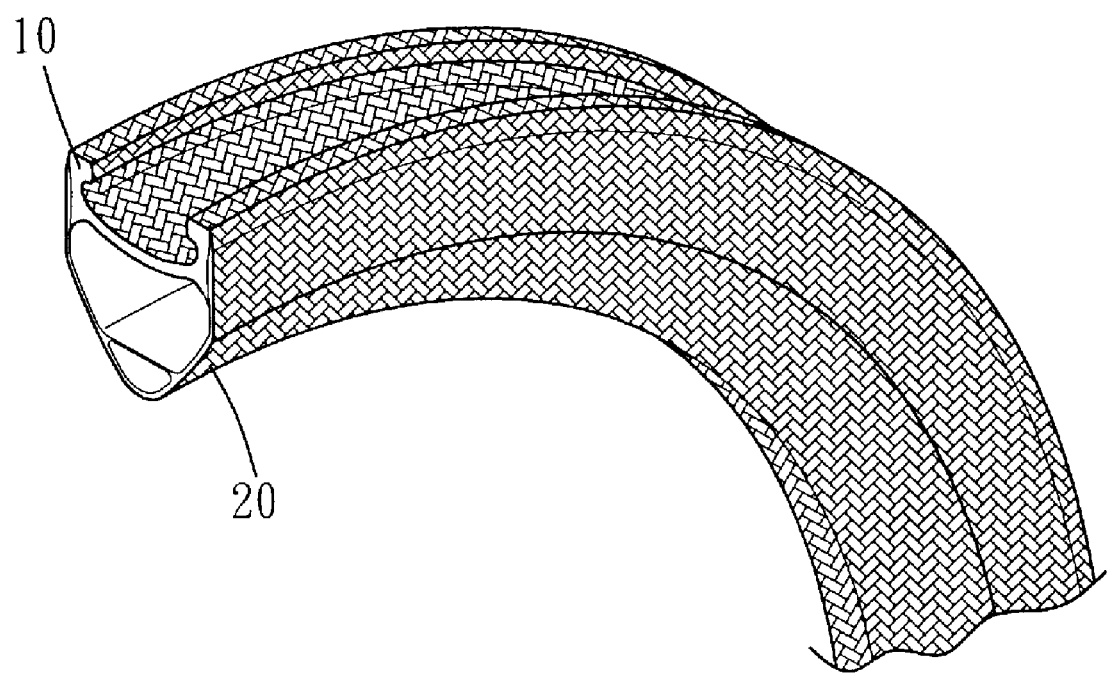
FIG. 4 is a perspective view to show a section of the bicycle rim of the present invention.
Figure 5:
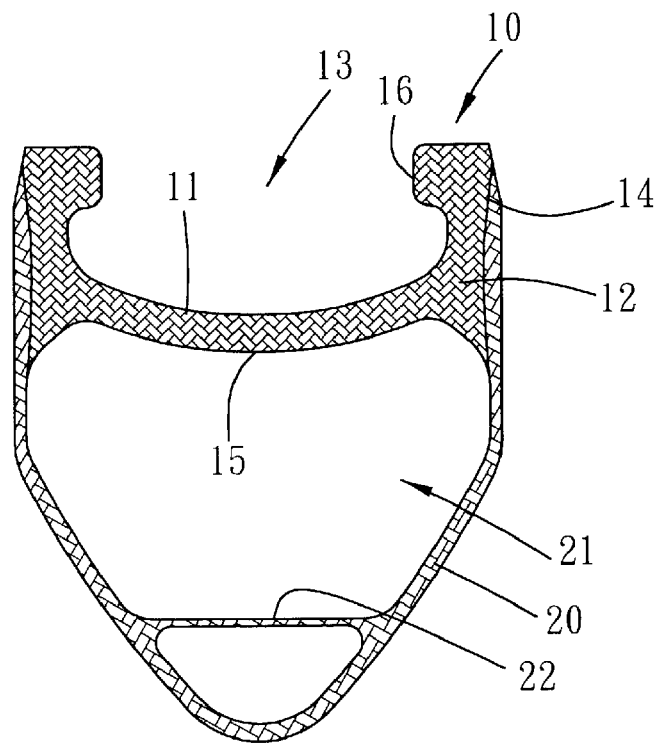
FIG. 5 is a cross sectional view to show the bicycle rim of the present invention.

Referring to FIG. 1, the method for making a bicycle rim 1 of the present invention comprises the following steps:

outer part arrangement S1: arranging composite material to be the outer part 10 in a first mold 30 as shown in FIG. 1A;

outer part molding S2: heating the composite material to be the outer part under pressure and the composite material being solidified to form the outer part 10 which includes an annular body 11 with two sidewalls 12, a tire space 13 defined between the annular body 11 and the two sidewalls 12, each sidewall 12 having an outside 14 as shown in FIG. 2;

inner part arrangement S3: arranging the outer part 10 in a second mold 31 as shown in FIG. 1B and arranging composite material to be an inner part 20 which encompasses at least one part of the outsides 14 of the outer part 10 as shown in FIG. 5, and inner part molding S4: heating the composite material to be the inner part 20 in the second mold 31 and the composite material to be the inner part being solidified and combined with the outer part 10 to obtain the bicycle rim 1 as shown in FIGS. 3 and 4.

It is noted that the composite material mentioned above is one of carbon fibers, glass fibers and KEVLAR fibers.

In the first embodiment of the method for making the bicycle rim, a chamber 21 is defined between the outer and inner parts 10, 20 and a reinforcement rib 22 is located within the chamber 21. Each of the two sidewalls 12 includes a lip 16 extending inward from an inside thereof so as to be connected to the tire (not shown) or to position an inner tube (not shown). The chamber 21 is made by the conventional method by using an inflatable bladder 32 (FIG. 1B) as mentioned in the prior art.

The inner part 20 includes at least one brake surface defined in an outside thereof. Although there are two lips 16 on the insides of the two sidewalls 12 of the outer part 10 and the lips 16 were supposed to be difficult to be de-molded, the modern techniques for de-molding can overcome the problem.

The bicycle rim 1 made by the method mentioned above comprises a substantially H-shaped outer part 10 including an annular body 11 and two sidewalls 12. Each sidewall 12 has an outside 14 and a tire space 13 is defined between the annular body 11 and the two sidewalls 12. Each of the two sidewalls 12 includes a lip 16 extending inward from an inside thereof. A substantially U-shaped inner part 20 is connected to the outer part 10 and a chamber 21 is defined between the outer and inner parts 10, 20. A reinforcement rib 22 is located within the chamber 21. The reinforcement rib 22 is made of composite material or metal.

The composite material of the inner part 20 encompasses at least 70% of the height of each of the outsides 14 of the outer part 10. The brake surface can also be made by attaching proper braking material to the outside of the inner part 20. The substantially H-shaped outer part 10 and the substantially U-shaped inner part 20 can be made individually and then combine the two parts together.

Figure 6:
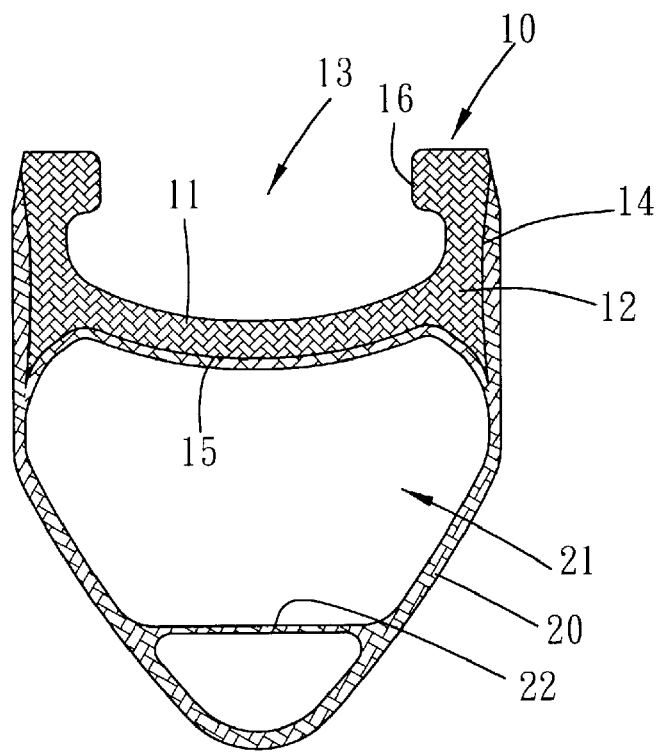
FIG. 6 is a cross sectional view to show another embodiment of the bicycle rim of the present invention.

As shown in FIG. 6 which shows the second embodiment of the bicycle rim, wherein the composite material of the inner part 20 is completely connected to the underside 15 of the annular body 11 and the outsides 14 of the sidewalls 12. The chamber 21 is defined in the inner part 20 which includes a reinforcement rib 22. The connection of the outer part 10 and the inner part 20 is strong and reliable.

The inventor has experienced that the outer part 10 and the inner part 20 made by two individual heat and press processes is efficient for obtaining qualified bicycle rim 1 when compared with the conventional method which uses only one time of heat press process. By using the method of the present invention, the outer parts can be easily controlled their specification within expected range. The method can meet the requirement of custom-made requirements from the market. The outer parts 10 can be made in mass production, and the inner parts 20 are made according to the customers' requirements. The outer parts 10 can be made in advantage during the low seasons and the manufactures only manufacture the inner parts 20 in the high seasons, this reduces 30% to 50% of the time required to provide the bicycle rims 1.

While we have shown and described the embodiment in accordance with the present invention, it should be clear to those skilled in the art that further embodiments may be made without departing from the scope of the present invention.

What is claimed is:

1. A method for making a bicycle rim, comprising:
   outer part arrangement (S1): arranging composite material to be the outer part (10) in a first mold;
   outer part molding (S2): heating the arranged composite material to be the outer part under pressure and the composite material being solidified to form the outer part (10) which includes an annular body (11) with two sidewalls (12), a tire space (13) defined between the annular body (11) and the two sidewalls (12), each sidewall (12) having an outside (14);
   inner part arrangement (S3): arranging the outer part (10) in a second mold and arranging composite material to be an inner part (20) in the second mold, the composite material to be the inner part (20) encompassing at least one part of the outsides (14) of the outer part (10), and
   inner part molding (S4): heating the composite material to be the inner part (20) in the second mold and the composite material to be the inner part being solidified and combined with the outer part (20) to obtain the bicycle rim (1).

2. The method as claimed in claim 1, wherein the composite material of the inner part (20) is connected to at least one part of an underside (15) of the annular body (11).

3. The method as claimed in claim 2, wherein the composite material of the inner part (20) is completely connected to the underside (15) of the annular body (11).

4. The method as claimed in claim 1, wherein a chamber (21) is defined between the outer and inner parts (10, 20), a reinforcement rib (22) is located within the chamber (21).

5. The method as claimed in claim 3, wherein the inner part (20) includes a chamber (21) and a reinforcement rib (22) is located within the chamber (21).

6. The method as claimed in claim 1, wherein the each of the two sidewalls (12) includes a lip (16) extending inward from an inside thereof.

7. The method as claimed in claim 1, wherein the inner part (20) includes at least one brake surface defined in an outside thereof.

8. The method as claimed in claim 1, wherein the composite material is one of carbon fibers and glass fibers.

\* \* \* \* \*